(Model.)
5 Sheets—Sheet 1.
T. TRIPP.
METALLIC PACKING.
No. 490,050. Patented Jan. 17, 1893.
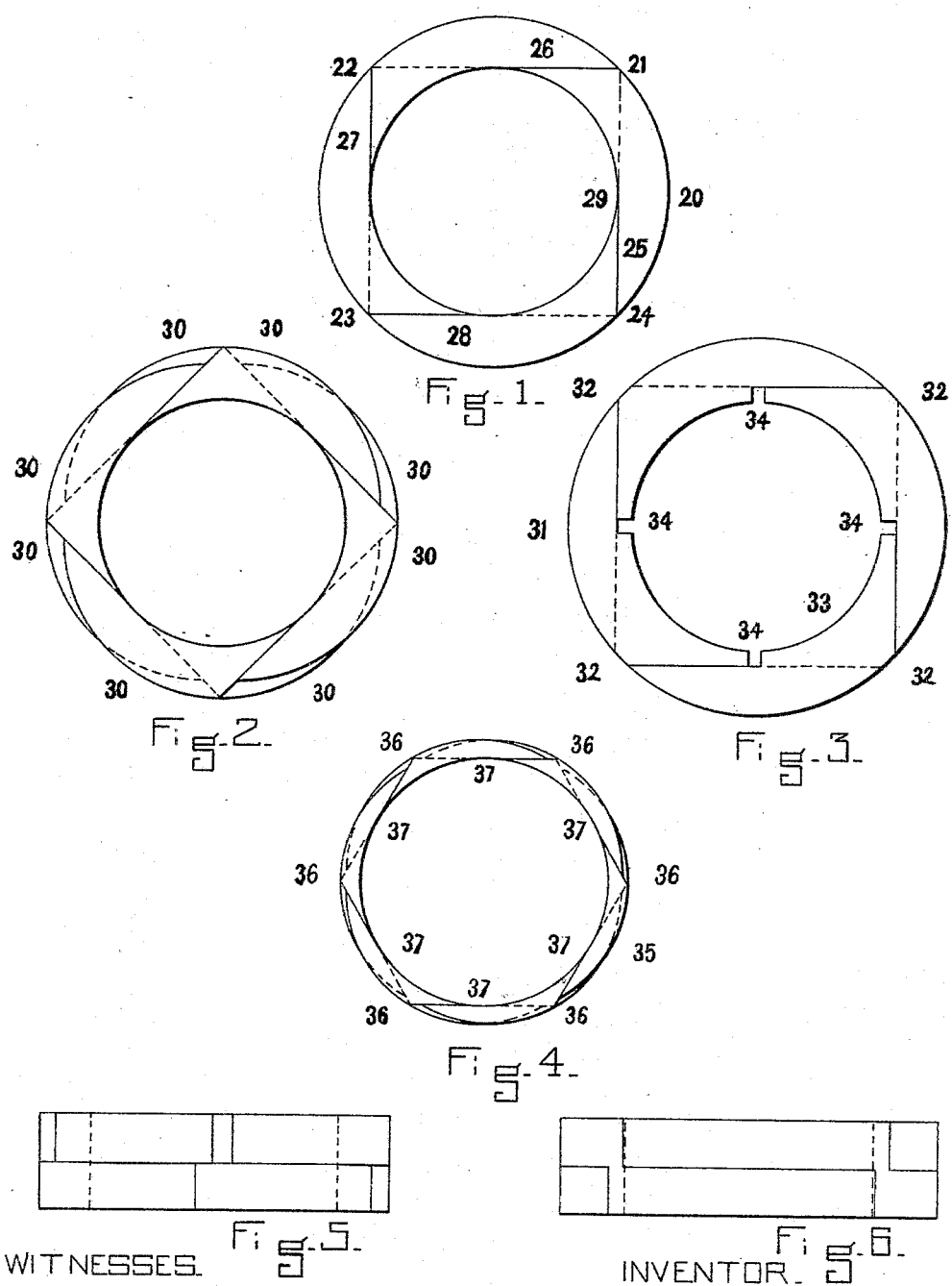
WITNESSES.
Charles L. Ellis
George L. Dolbeare
INVENTOR.
Thomas Tripp
BY E. Frank Woodbury
ATTORNEY.

(Model.)

T. TRIPP.
METALLIC PACKING.

No. 490,050.                    Patented Jan. 17, 1893.

WITNESSES
Charles L. Ellis
George L. Dolbeare

INVENTOR
Thomas Tripp
BY
E. Frank R. Woodbury
ATTORNEY (Model.) 5 Sheets—Sheet 3.
T. TRIPP.
METALLIC PACKING.

No. 490,050. Patented Jan. 17, 1893.

WITNESSES.
Charles L. Ellis.
George L. Delbeare.

INVENTOR.
Thomas Tripp
BY E. Frank Woodbury
ATTORNEY.

(Model.) 5 Sheets—Sheet 4.

T. TRIPP.
METALLIC PACKING.

No. 490,050. Patented Jan. 17, 1893.

WITNESSES. INVENTOR.
Charles R. Ellis Thomas Tripp
George L. Dolbeare BY E. Frank Woodbury
ATTORNEY.

(Model.)

5 Sheets—Sheet 5.

T. TRIPP.
METALLIC PACKING.

No. 490,050. Patented Jan. 17, 1893.

WITNESSES
Chas. L. Ellis
George L. Dolbeare

INVENTOR
Thomas Tripp.
By E. Frank Woodbury
Attorney

UNITED STATES PATENT OFFICE.

THOMAS TRIPP, OF AVON, MASSACHUSETTS.

METALLIC PACKING.

SPECIFICATION forming part of Letters Patent No. 490,050, dated January 17, 1893.

Application filed June 4, 1892. Serial No. 435,553. (Model.)

*To all whom it may concern:*

Be it known that I, THOMAS TRIPP, a citizen of the United States, residing at Avon, in the county of Norfolk and State of Massachusetts, have invented a new and useful Metallic Packing, of which the following is a specification.

My invention relates to metallic packings for pistons, piston valves, and the like. The packing is composed of an even number of like packing pieces, four or more in number; and each piece is composed of two segmental parts, one part slightly overlapping the other, the parts are preferably cast as one piece, and each part is either above or below its constituent part; but in each packing, all the packing pieces should be alike.

My invention has for its object, a packing, each piece of which may be so made as to be strong and durable and having no delicate portions, the method of construction being such that the packing pieces, when assembled, form a packing of great strength, and the pieces are so interlocked as to permit radial movements. By reason of above described features, the packing will be extremely effective and durable.

Figures 7, 8, 9:
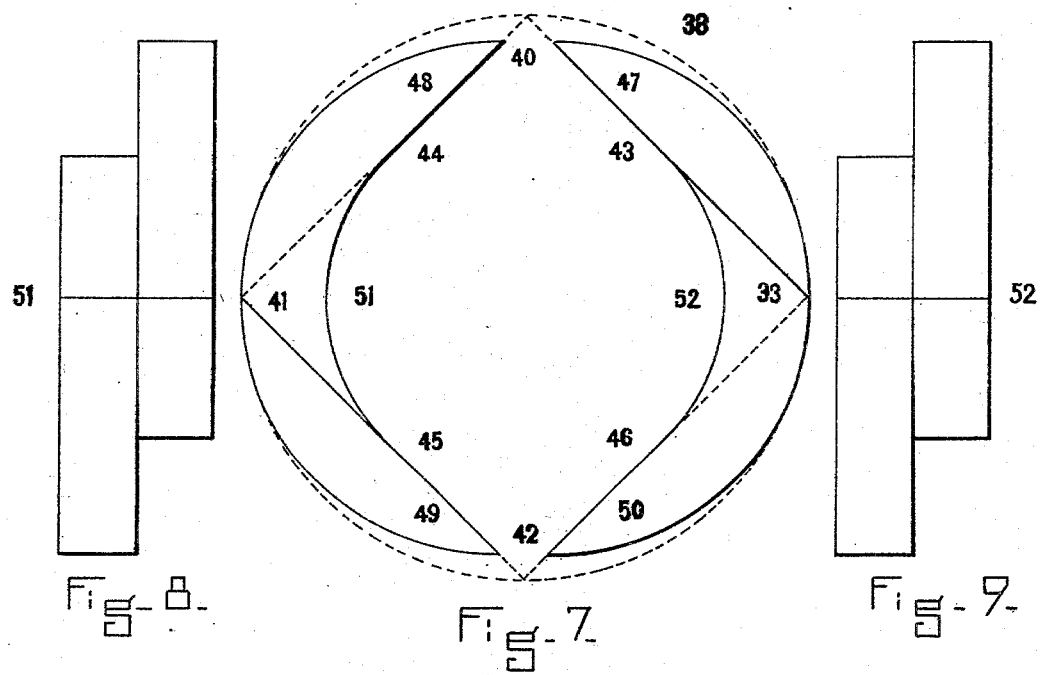
Figures 10, 11, 12:
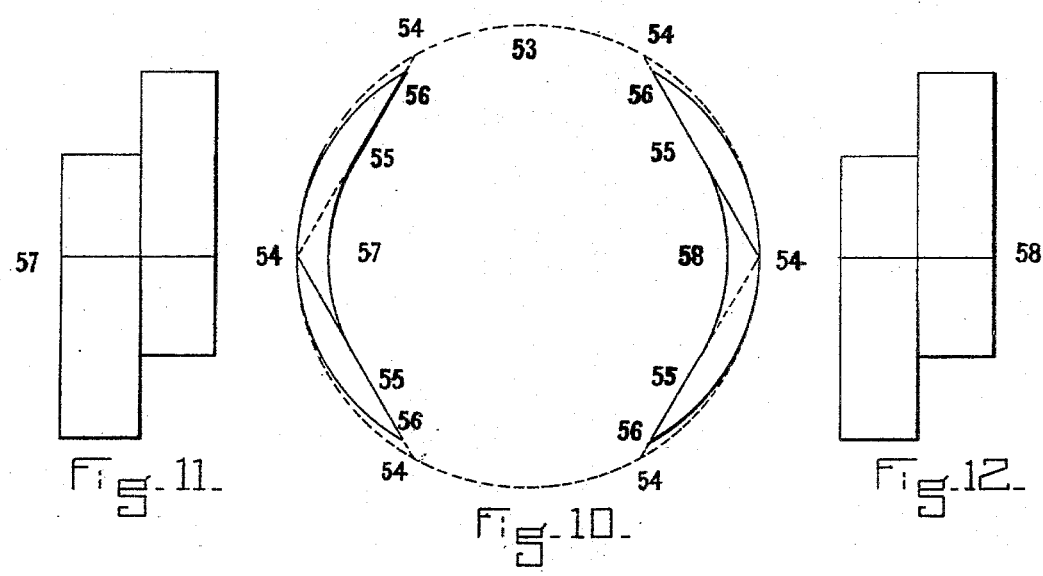
Figure 14:
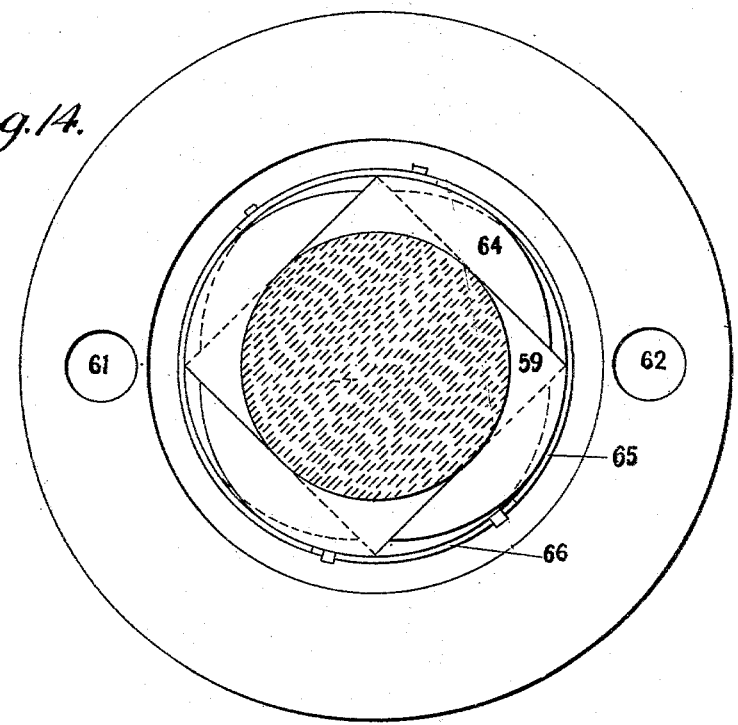
Figure 13:
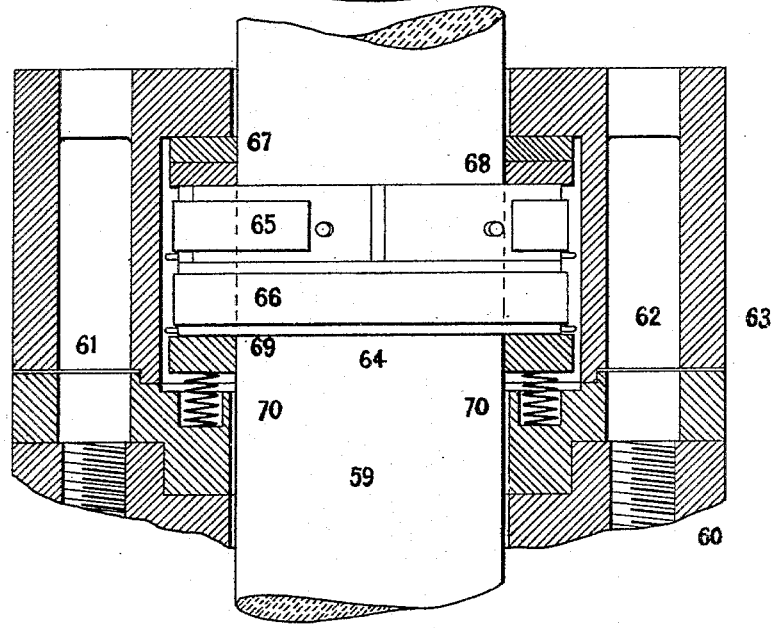
Figure 15:
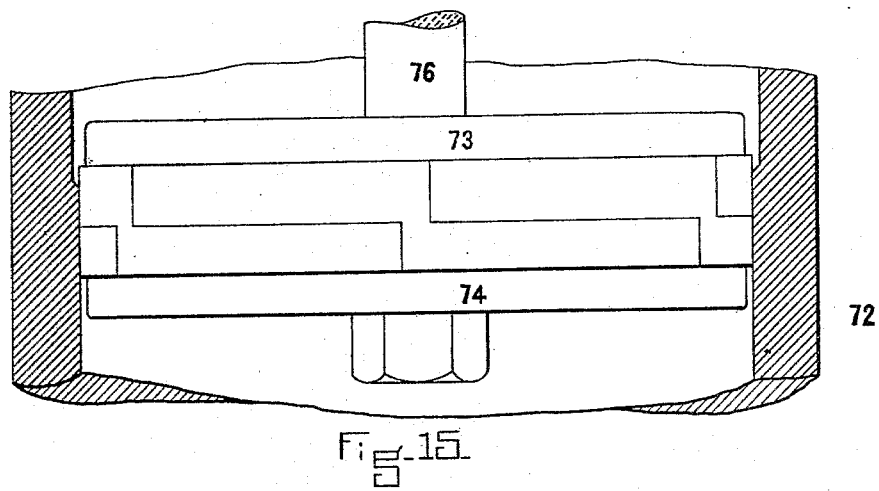
Figure 17:
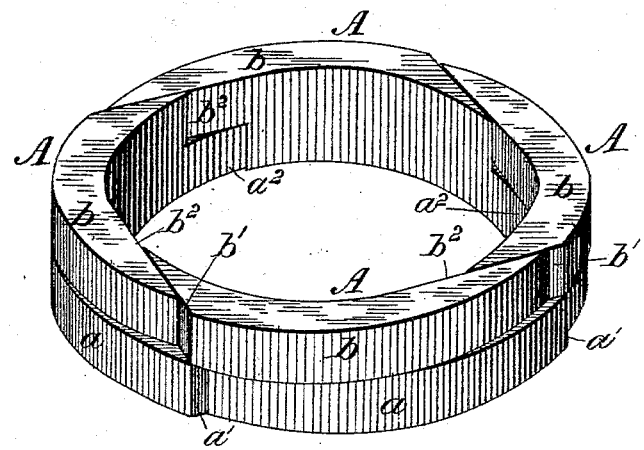
Figure 18:
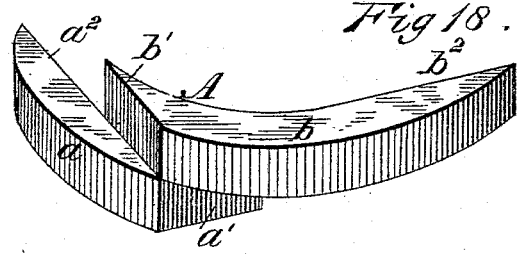

Figure 1. represents, in plan; a piston rod packing composed of four like separate pieces. This view or drawing is made to illustrate the theoretical layout or design of the packing. Fig. 2. represents a four piece piston rod packing, in plan, ready for use. Fig. 3. represents in plan, a four piece packing adapted for use in pistons, piston valves, and the like. Fig. 4. represents, in plan, a six piece piston rod packing. Fig. 5. is an elevation of Fig. 2. Fig. 6. is an elevation of Fig. 3. Fig. 7. represents, upon an enlarged scale, in plan, two pieces of the packing shown by Fig. 2. illustrating the method of construction of the packing, as composed of four like pieces. Fig. 8. represents, in elevation, one of the packing pieces shown in Fig. 7. and Fig. 9. represents, in elevation, the other packing piece, shown in Fig. 7. Fig. 10. represents, in plan, upon an enlarged scale, two pieces of the six piece packing shown by Fig. 4. illustrating the method of construction. Fig. 11. represents, in elevation, one of, the packing pieces shown in Fig. 10. and Fig. 12 represents in elevation, the other packing piece shown in Fig. 10. Fig. 13. represents a four piece rod packing as applied to the piston rod of an engine, the piston rod and piston rod packing being shown in elevation, and the packing sliding rings, follower ring, and gland being shown in section. Fig. 14. is a full plan view of Fig. 13. the sliding rings and gland being removed in order to more clearly show the packing. Fig. 15 represents a six piece piston packing as applied to a steam cylinder, and piston, the piston being shown in elevation, and the cylinder in section, and Fig. 16. is a full inverted plan of Fig. 15. the piston follower being removed in order to show more clearly the packing, the cylinder being represented in section. Fig. 17 represents a perspective view of this improved packing composed of four packing pieces. Fig. 18 represents a perspective view of one of the packing pieces of this improved packing.

The method of construction of this packing, as represented by Fig. 1. is as follows:—The outer circle 20 is first drawn. Then on the outer circle 20. as a packing composed of four pieces is desired, the four points (equally spaced) 21—22—23 and 24 are laid out. Between these points, the lines 25—26—27 and 28 are drawn, these lines represent the interlocking surfaces. It will be noticed, that the interlocking surfaces, opposite each other, are parallel. That is: Surface 25 is parallel to surface 27. so also is surface 26 parallel to surface 28. Finally, the inner circle 29. is drawn touching the interlocking surface lines.

In order to adapt the packing, shown by Fig. 1. for use upon piston rods and the like, the interlocking fingers 30. are cut back, as shown by Figs. 2 and 5. so as to permit the contraction of the packing pieces, to compensate for wear, without the projecting of the fingers beyond the outer circle of the packing, which would interfere with the correct working of the springs, that are placed about the packing as shown by Figs. 13 and 14.

To adapt the packing for use in cylinders and for piston valves and the like, the packing ring, as represented by Figs. 3 and 6. has the outer circle 31. drawn within the layout points so as to present for wear surfaces 32. having some considerable area, instead of a line, such as would be presented for wear, if the outer circle extended to the layout points, as shown by Fig. 1. At the same time, the inner circle 33. is drawn considerably within the interlocking surfaces so as to give sufficient width to the packing ring to provide the requisite strength. The relieving cuts 34. are made in order to provide for a slight contraction of the packing, which sometimes occurs when in use.

The packing represented by Fig. 4. composed of six pieces, is constructed in a similar manner to the packing shown by Fig. 1. as follows: On the outer circle 35. are laid out the six (equally spaced) points 36. as the packing is composed of six pieces, and between these points are drawn the interlocking surface lines 37. Opposite interlocking surfaces are parallel.

In constructing a packing composed of any even number of pieces, the outer circle of the packing is divided into as many equally spaced points as there are pieces of packing, and all opposite interlocking surfaces are parallel. Two of the packing pieces, composing the packing represented by Fig. 2 are shown, upon an enlarged scale by Figs. 7—8 and 9. and they are constructed as follows: The outer circle 38. is divided into the four equally spaced points 39—40—41 and 42 and between these points the interlocking surface lines 43—44—45 and 46. are made. The interlocking fingers 47—48—49 and 50 are cut back or away as shown.

Fig. 8. represents in elevation, packing piece 51. and it will be observed that one part of the packing slightly over-laps the other, and Fig. 9. represents in elevation, packing piece 52. which is constructed in the same manner as packing piece 51. and all the packing pieces, (four in number) are constructed in the same manner as pieces 51 and 52. and therefore all are alike. In a like manner are constructed the two packing pieces, represented by Figs. 10—11 and 12. upon an enlarged scale composing the packing shown by Fig. 4. The outer circle 53. is divided into six equally spaced points 54. between these points the interlocking surfaces 55. are constructed, and the interlocking fingers 56. are cut back as shown. Fig. 11. represents, in elevation, packing piece 57. and Fig. 12 represents, in elevation, packing piece 38. These two packing pieces are alike, and in each piece, one part over-laps the other. The packing, represented by Fig. 4. is composed of six pieces like packing piece 57.

The packing is applied to a piston rod as illustrated by Figs. 13 and 14. as follows: The piston rod 59. and a portion of the gland 60. of an ordinary steam engine are shown. To the gland is fastened, by means of bolts not shown which pass through the holes 61 and 62. the double case 63. within which is placed the packing 64. This packing is composed of four pieces made the same as the packing represented by Figs. 2 and 5 and the packing pieces are held in contact with the piston rod by the use of the springs 65 and 66. The packing is held securely in its position between the sliding rings 67. and 68. and the follower ring 69. by means of a set of spiral springs, two of which, springs 70 and 71, are shown in Fig. 13. It will be observed that the packing will go with the rod, which in operation may have a slightly irregular movement.

Figure 16:
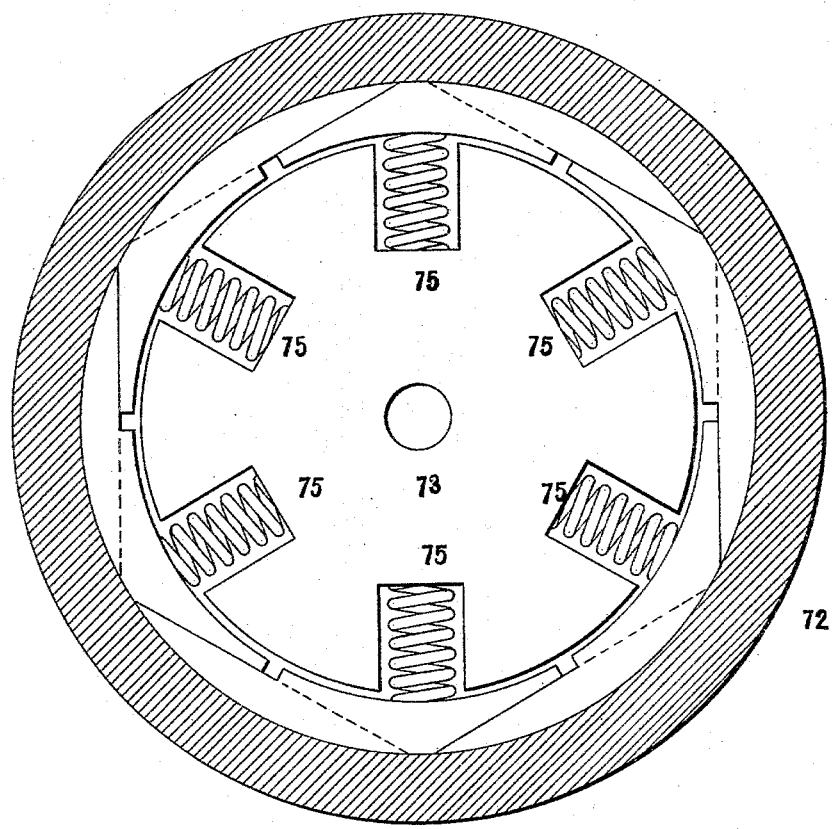

Figs. 15 and 16. illustrate the application of a six piece packing same as represented by Fig. 4, (except that it is arranged for a piston packing,) to a piston of an engine.

The engine cylinder 72. is provided with a piston, composed of the piston head 73. and the follower 74. between which the packing is placed and held in contact with the cylinder by the use of a set of spiral springs as 75. The piston is provided with the piston rod 76.

The packing, by reason of its construction, is especially adapted for use in steam under high temperature, for the reason that each packing piece may be readily and cheaply made of any desired quality or kind of metal. It may also be made very narrow, that is to say, the area presented for steam pressure to act upon to press the packing against a piston rod, may be reduced to a minimum quantity without impairing its value.

To more clearly illustrate the packing I have added Figs. 17 and 18, Fig. 17 representing in perspective a four-piece packing and Fig. 18 representing in perspective one of the packing pieces. Each packing piece, as A, is composed of two segmental parts, a lower segmental part $a$ and an upper segmental part $b$. These segmental parts are united and overlap each other as shown in Fig. 18, at what may be termed their inner ends when said parts are considered with reference to the individual packing piece which they form. The lower segmental part $a$ is provided at its lapping end on its outer surface with an outer tangential face $a'$ disposed on a tangent to the inner circle, 29, Fig. 1, on which the inner face of said part is described and at its outer end on its inner surface with an inner tangential face $a^2$ also disposed on a tangent to said circle and in case of a four-piece packing at right angles to the tangential face $a'$. The upper segmental part $b$ is provided at its lapping end on its outer surface with an outer tangential face $b'$ disposed on a tangent to the inner circle 29 Fig. 1 on which the inner face of said part $b$ is also described, and at its outer end on its inner surface with an inner tangential face $b^2$ disposed on a tangent to said circle and in the case of a four-piece packing at right angles to the tangential face $b'$. Each packing piece is like the other packing pieces of the same packing and each segmental part of each packing piece is like the other segmental part of the same packing piece. The tangential faces form the interlocking surfaces of the packing, the inner tangential faces of one packing piece fitting against the outer tangential faces of the adjoining packing pieces. When the packing pieces are assembled the interlocking surfaces are parallel at diametrically opposite points whether the packing be composed of four or more packing pieces.

By reason of its interlocking qualities, the packing is not liable to tip, especially when used in piston valves, and for the same reason, it is peculiarly adapted to rods having a rotary motion.

What I claim as new and desire to secure by Letters Patent is:—

1. A metallic packing composed of an even number of packing pieces, four or more in number, each packing piece being composed of two united segmental parts overlapping each other at their inner ends, the interlocking surfaces of said packing pieces being parallel on opposite sides of the packing, substantially as described.

2. A metallic packing composed of an even number of packing pieces, four or more in number, each packing piece being composed of two united segmental parts overlapping each other at their inner ends, each segmental part having an outer tangential face at one end and an inner tangential face at its other end, the tangential faces of the several packing pieces forming interlocking surfaces which are parallel on opposite sides of the packing, substantially as set forth.

3. A metallic packing composed of an even number of packing pieces, four or more in number, each packing piece being composed of two united segmental parts overlapping each other at their inner ends, the interlocking surfaces of said packing pieces being parallel on opposite sides of the packing, means for holding said packing pieces, and a spring or springs for forcing them in contact with the wearing surfaces, substantially as set forth.

4. A metallic packing composed of an even number of packing pieces, four or more in number, each packing piece being composed of two united segmental parts overlapping each other at their inner ends, each segmental part having an outer tangential face at one end and an inner tangential face at its other end, the tangential faces of the several packing pieces forming interlocking surfaces which are parallel on opposite sides of the packing, and means for holding said packing pieces in contact with the wearing surface.

In testimony whereof I have signed my name to this specification in the presence of two subscribing witnesses.

THOMAS TRIPP.

Witnesses:
E. FRANK. WOODBURY,
JAMES A. WOODBURY.